Patented June 15, 1948

2,443,496

UNITED STATES PATENT OFFICE 2,443,496

DIHYDROPYRAN COPOLYMERS

Nestor Winston Flodin, Niagara Falls, N. Y., assignor to E. I. du Pont de Nemours and Company, Wilmington, Del., a corporation of Delaware No Drawing. Application April 12, 1945,
Serial No. 588,078

14 Claims. (Cl. 260—86)

This invention relates to novel copolymers and processes for the production thereof. More particularly it relates to novel copolymers of vinyl esters with dihydropyran and to new processes for the production thereof. This invention also relates to novel hydrolysis products of vinyl ester-dihydropyran copolymers.

It is an object of this invention to provide novel and useful copolymers of vinyl esters. Another object is to provide a process for the production of copolymers of vinyl esters and dihydropyran. A further object is to provide new hydrolysis products of copolymers of vinyl esters and dihydropyran. It is also an object of this invention to provide a new class of copolymers having improved water resistance and adhesion to smooth surfaces. These and other objects will be apparent from the ensuing description of this invention.

The above objects are attained in accordance with this invention by bringing a vinyl ester of an organic acid and dihydropyran into contact with a polymerization catalyst. The copolymerization product thus obtained is hydrolyzed by known methods to produce dihydropyran-vinyl alcohol copolymers.

I have discovered that copolymerization of dihydropyran with vinyl esters may be carried out in an inert solvent, in bulk, or in aqueous emulsion. Preferably the well-known "emulsion polymerization" procedure is utilized. Thus, for example, an emulsion may be prepared by mixing vinyl acetate, dihydropyran, water, and a suitable dispersing agent, and the resulting emulsion refluxed in the presence of small amounts of a known catalyst for the polymerization of vinyl esters. When polymerization is complete, the reaction mixture may be steam distilled to remove unreacted monomer and the coagulated product washed and dried.

In the process of my invention any of the known catalysts for the polymerization of vinyl esters may be utilized; however, I prefer to use as catalyst a peroxygen compound, i. e. a compound capable of yielding active oxygen. Illustrative of the peroxygen compounds which are satisfactory in the practice of my invention are the organic peroxides such as lauroyl, benzoyl, acetyl, acetyl benzoyl, tertiary butyl, acetone, and diethyl peroxides, and ascaridole. The peracids, and in particular the monoperacids, including peracetic, monopersuccinic, monopersulfuric, and monoperphthalic acids, are also suitable. Inorganic peroxides, e. g. hydrogen peroxide, sodium peroxide, the alkali and alkali metal perborates, e. g. sodium perborate and ammonium perborate, may also be used. Persulfates including sodium persulfate and ammonium persulfate are also satisfactory.

In utilizing my preferred mode of operation wherein the "emulsion polymerization" technique is employed, I prefer to use a water-soluble catalyst, for example, hydrogen peroxide or ammonium persulfate. On the other hand, if the copolymerization of vinyl ester and dihydropyran is to be carried out in bulk or in solution in an organic solvent, an organic peroxide, for example lauroyl or benzoyl peroxide, is preferred.

In one of the preferred embodiments of my invention a reducing agent is also added to the reaction mixture in addition to the peroxygen compound catalyst in accordance with known procedures. For example, sodium formaldehyde sulfoxylate, zinc formaldehyde sulfoxylate, sodium hydrosulfite, zinc hydrosulfite, sodium bisulfite, sodium thiosulfate, calcium bisulfite, or other suitable reducing agent may be introduced into the emulsion containing the vinyl ester, dihydropyran, dispersing agent, peroxygen compound, and water. Other suitable reducing agents include formamidine sulfinic acids, p-toluene sulfinic acids, and dialkyl sulfites.

If desired, the copolymerization may be carried out in an organic solvent such as xylene, benzene, methanol, or ethyl acetate. When proceeding in this manner, it is preferable to utilize a catalyst which is readily soluble in the organic solvent, although when the solvent chosen is methanol or ethanol, for example, hydrogen peroxide may be used with satisfactory results. Likewise, when a reducing agent is employed in conjunction with a peroxygen catalyst, the particular reducing compound to be used is preferably selected with reference to solubility in the particular solvent to be utilized.

The amount of catalyst used may be varied considerably with satisfactory results. In general, when utilizing a peroxygen compound as catalyst, I prefer to use concentrations of 0.01% to 5% for optimum results. The concentration of reducing agent likewise is preferably within the range 0.001% to 5%, the concentrations being by weight based on the weight of polymerizable components in the reaction mixture.

Although the copolymerization may be carried out at temperatures ranging from about room temperature to about 150° C. successfully, I prefer, for most efficient operation, to operate at temperatures of about 50° C. to about 100° C., and in general I have found it desirable to operate at the reflux temperature of the reaction mixture.

I have discovered that the vinyl ester-dihydropyran copolymers may be hydrolyzed to obtain copolymers of dihydropyran containing the vinyl alcohol group, thus providing copolymeric materials having enhanced properties, since, as is well known, the vinyl alcohol group confers toughness, high tensile strength, and resistance to abrasion, which properties are of primary importance for many applications of such resinous materials. Thus, the novel copolymers which I obtain by hydrolysis of the vinyl ester-dihydropyran copolymers of my invention combine the desirable properties imparted by the vinyl alcohol group with the improved water resistance of polymers containing dihydropyran.

The hydrolysis may be partial or substantially complete as desired, and thus the properties of the products may be varied by regulating the degree of hydrolysis and, accordingly, the proportion of vinyl alcohol groups present in the molecule. For example, if a product of high water resistance and optimum adhesive properties is desired, hydrolysis will be allowed to proceed only to a small or modern extent. On the other hand, if the maximum toughness, strength, and abrasion resistance are desired, hydrolysis may be carried nearly or entirely to completion.

The vinyl ester-dihydropyran copolymers may be hydrolyzed by any of the known methods for the hydrolysis of polyvinyl esters. For example, the copolymer may be dispersed in an alcohol such as methanol in the presence of a hydrolysis catalyst such as sodium methylate and the mixture heated until the desired degree of hydrolysis is obtained. The hydrolyzed copolymer may then be recovered by filtration, washed with methanol, and dried. Alcohols other than methanol may be used as a medium for the hydrolysis, for example, ethanol, propanol, butanol, or isopropanol. If desired, the copolymers may be hydrolyzed in an aqueous medium, and acid or alkaline hydrolysis catalysts may be used.

The following examples illustrate my invention:

Example I

An emulsion was prepared by mixing 50 g. vinyl acetate, 50 g. 2,3-dihydropyran, 94 g. water, and 6 g. low viscosity, partially hydrolyzed polyvinyl alcohol. Two grams of sodium acetate and 0.5 g. glacial acetic acid were added to keep the system buffered at pH 4 to 4.5. The emulsion was raised to reflux temperature, and periodical small additions of hydrogen peroxide and zinc formaldehyde sulfoxylate were made to induce and maintain polymerization. After eight hours, the mixture was steam distilled to remove unreacted monomer. The white coagulated polymer was washed by kneading under warm and cold water, then dried at 70° C. for 42 hours. The product dried to a hard, brittle, light yellow polymer. The yield was 25.1 g. or 25% of the theoretical. Determination of the saponification number showed that the product contained 26% by weight of dihydropyran.

Example II

A procedure similar to that given in Example I was followed, except that the monomer composition by weight per cent was 75 per cent vinyl acetate, 25 per cent 2,3-dihydropyran. Polymerization was allowed to proceed for 6.5 hours. The white granular copolymer was washed several times with hot water, then dried at 70° C. Determination of the saponification number showed that the product contained 9 per cent by weight of dihydropyran. Yield 34.4 g. or 34 per cent of theoretical.

Example III

A procedure similar to that given in Example I was followed, except that the monomer composition by weight per cent was 90 per cent vinyl acetate, 10 per cent 2,3-dihydropyran. Polymerization was allowed to proceed for two hours. The copolymer was coagulated by adding sodium acetate and heating. The coagulated resin was filtered off and washed with water, then dried for 50 hours at 70° C. Yield 70 g. or 70 per cent of theoretical. A saponification number determination showed that the copolymer contained 6 percent dihydropyran by weight.

Example IV

Twenty grams of copolymer containing 74 per cent of vinyl acetate and 26 per cent of 2,3-dihydropyran by weight was dispersed in 200 ml. methanol with stirring. Six-tenths grams of sodium methylate was added and the mixture heated at 40° C. for several hours. The hydrolyzed copolymer was filtered off, washed with methanol and dried at 70° C. Yield of hard brown vinyl alcohol/dihydropyran copolymer was 8.5 g. (not corrected for handling losses). The material was insoluble in water and methanol, but soluble in 50% aqueous acetic acid. It adheres strongly to smooth glass and metal surfaces.

Example V

Thirty grams of copolymer containing 91 per cent of vinyl acetate and 9 per cent of 2,3-dihydropyran by weight was dispersed in 300 ml. methanol with stirring. Nine-tenths gram of sodium methylate was added and the mixture heated at 40° C. for two hours. The product was filtered off, washed with methanol, and dried at 70° C. Yield of hard brown hydrolyzed copolymer was 18 g. The material was insoluble in water and methanol, but soluble in 50 per cent aqueous acetic acid.

Example VI

Fifty grams of copolymer containing 94 per cent of vinyl acetate and 6 per cent of 2,3-dihydropyran by weight was dispersed in 500 ml. methanol with stirring. One and one-half grams of sodium methylate was added and the mixture heated at 40° C. for two hours. The product was filtered off, washed with methanol, and dried at 70° C. Yield of hard tan hydrolyzed copolymer was 26 g. The material was soluble in hot water.

Various vinyl esters of organic acids may be copolymerized with dihydropyran in accordance with my invention, including the vinyl esters of aliphatic and aromatic acids. In addition to vinyl acetate I may utilize vinyl propionate, vinyl butyrate, vinyl trimethyl acetate, vinyl stearate, vinyl benzoate, vinyl phthalate, or various other vinyl esters.

In accordance with my invention dihydropyran and a vinyl ester may be copolymerized in any desired proportion. However, I prefer to utilize about 1 per cent to about 30 per cent of dihydropyran by weight based on the total weight of the polymerizable components present. I have found that the use of 1 per cent of dihydropyran is sufficient to impart improved water resistance and adhesive properties to the copolymers. On the other hand, although copolymers containing more than 30 per cent dihydropyran are useful and may in some instances be preferred, copolymers containing from about 1 per cent to about 30 per cent dihydropyran are most suitable for uses where maximum toughness and strength are required combined with good water resistance and adhesive qualities.

The vinyl ester-dihydropyran copolymers of this invention are useful as hot melt, solvent activated, or emulsion type adhesives. The vinyl alcohol-dihydropyran copolymers, obtainable in accordance with this invention by hydrolysis of the vinyl ester-dihydropyran copolymers, are particularly suitable for fabrication into films, fibers, and molded and pressed articles. These products are also useful for adhesive compositions, particularly where it is desired to bond smooth glass or metal surfaces.

Various modifications of my novel processes and products may be made without departing from the scope of my invention, which is to be restricted only in accordance with the scope of the following claims. In one modification of my invention, for example, a suitable emulsifying agent such as starch, dextrin, or polyvinyl alcohol may be added to the reaction mixture in sufficient quantity to form a stable emulsion of the copolymer produced which may then be utilized directly as a sizing agent, adhesive, or for other purposes. Other modifications will be apparent to those skilled in the art.

I claim:

1. The process for the copolymerization of dihydropyran and a vinyl ester of a carboxylic acid containing no ethylenic or acetylenic unsaturation and no substituents other than substituents consisting solely of carbon and hydrogen which comprises bringing a mixture of said compounds containing at least 1% of dihydropyran and at least 50% vinyl ester, said mixture consisting essentially of dihydropyran and said vinyl ester, into contact with a peroxygen compound catalyst.

2. The process of claim 1 wherein the polymerization is carried out at 50° to 100° C.

3. The process of claim 1 wherein the polymerization is carried out in aqueous emulsion in the presence of a peroxygen compound.

4. The process of claim 1 wherein the polymerization is carried out in the presence of a peroxygen compound and a reducing compound.

5. The process of claim 1 wherein the polymerization is carried out in aqueous emulsion in the presence of a peroxygen compound and a reducing compound.

6. A copolymer of at least 1% by weight of dihydropyran and at least 50% by weight of a vinyl ester of a carboxylic acid having no ethylenic or acetylenic unsaturation and no substituents other than substituents consisting solely of carbon and hydrogen, said copolymer consisting essentially of polymerized dihydropyran and vinyl ester.

7. A copolymer of at least 1% dihydropyran and at least 50% vinyl acetate, said copolymer consisting essentially of polymerized dihydropyran and vinyl acetate.

8. A copolymer of 70% to 99% by weight of vinyl ester of a carboxylic acid having no ethylenic or acetylenic unsaturation and no substituents other than substituents consisting solely of carbon and hydrogen and 1% to 30% by weight of dihydropyran.

9. A copolymer of 70% to 99% by weight of vinyl acetate and 1% to 30% by weight of dihydropyran.

10. A copolymer of 70% to 99% by weight of vinyl alcohol and 1% to 30% by weight of dihydropyran.

11. A copolymer of at least 50% by weight of partially hydrolyzed polyvinyl acetate and at least 1% by weight of dihydropyran, said copolymer consisting essentially of polymerized vinyl acetate, vinyl alcohol and dihydropyran.

12. A copolymer which comprises the polymeric hydrolysis product obtainable by hydrolysis of a copolymer of at least 1% by weight of dihydropyran and at least 50% by weight of vinyl ester of a carboxylic acid having no ethylenic or acetylenic unsaturation and no substituents other than substituents consisting solely of carbon and hydrogen, said copolymer consisting essentially of polymerized dihydropyran, vinyl ester and vinyl alcohol.

13. A copolymer from the group consisting of a copolymer of at least 1% by weight of dihydropyran and at least 50% by weight of vinyl ester of a carboxylic acid having no ethylenic or acetylenic unsaturation and no substituents other than substituents consisting solely of carbon and hydrogen, said copolymer consisting essentially of polymerized dihydropyran and vinyl ester and the polymeric product obtainable by hydrolysis of said copolymer of a vinyl ester and dihydropyran.

14. The process for the production of a copolymer of vinyl alcohol and dihydropyran which comprises hydrolyzing a copolymer of at least 1% by weight of dihydropyran and at least 50% by weight of vinyl ester of a carboxylic acid having no ethylenic or acetylenic unsaturation and no substituents other than substituents consisting solely of carbon and hydrogen, said copolymer consisting essentially of polymerized dihydropyran and vinyl ester.

NESTOR WINSTON FLODIN.

REFERENCES CITED

The following references are of record in the file of this patent:

FOREIGN PATENTS

| Number | Country | Date |
|---|---|---|
| 558,106 | Great Britain | Dec. 21, 1943 |